Figure 5:
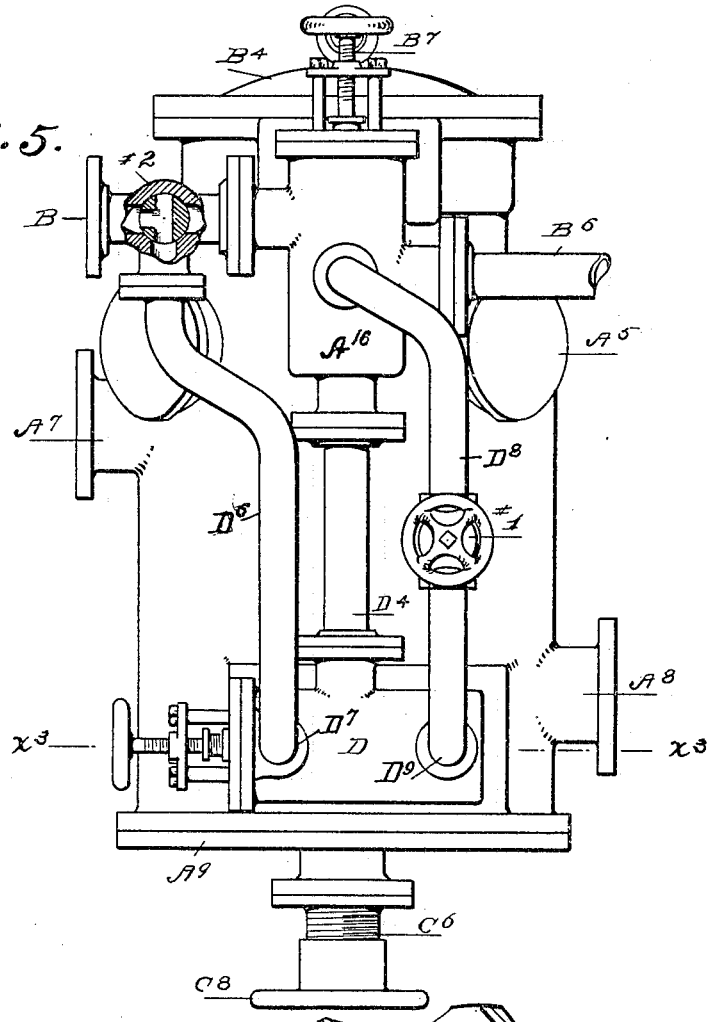

No. 787,958. PATENTED APR. 25, 1905.
H. C. TABRETT & W. LEWIN.
COMBINED FEED WATER FILTER AND HEATER.
APPLICATION FILED MAY 11, 1904.
3 SHEETS—SHEET 1.
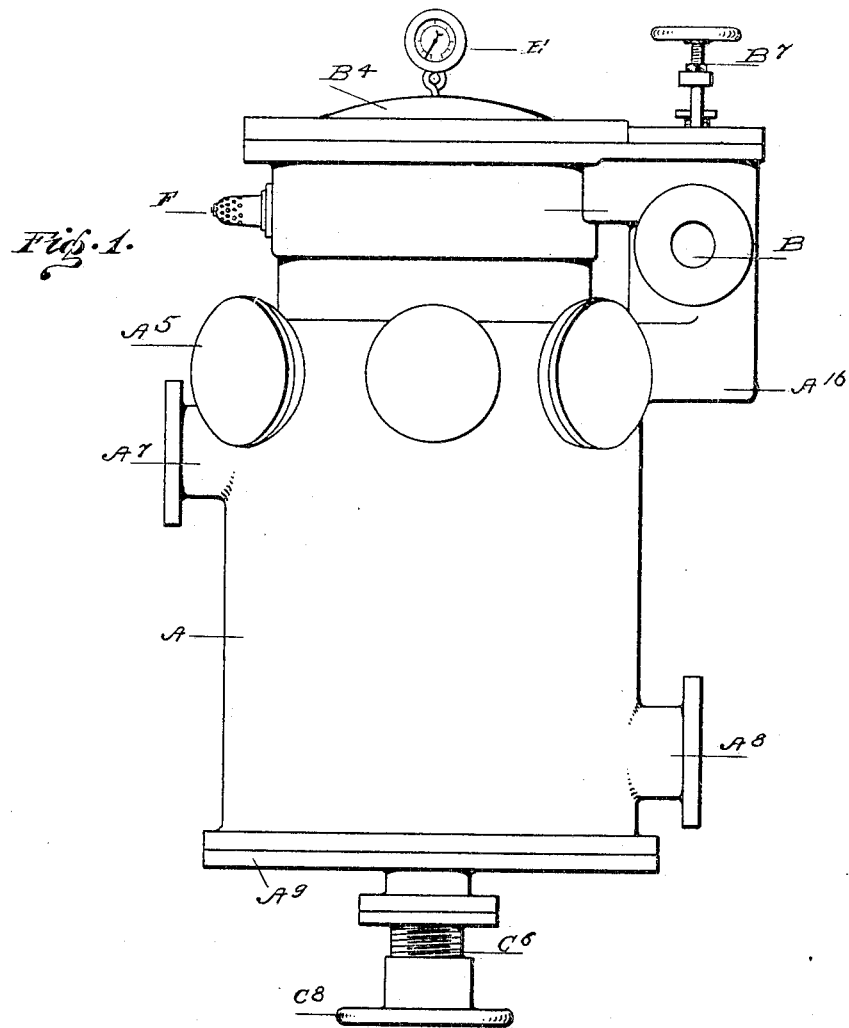
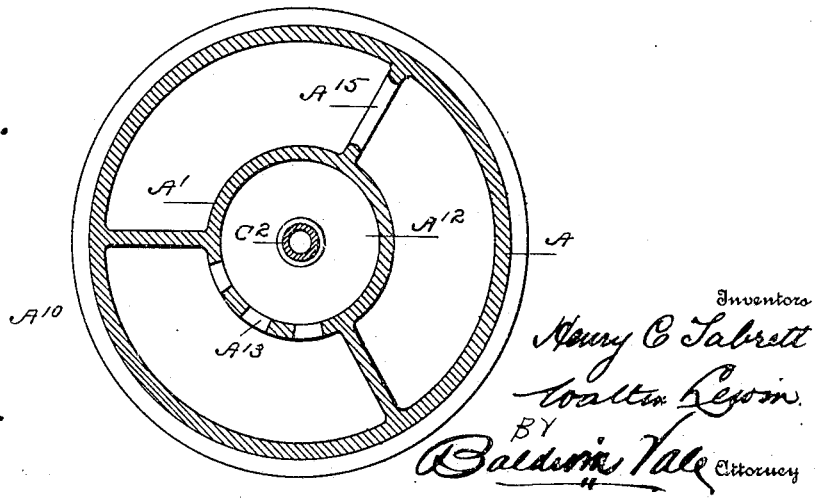

No. 787,958. PATENTED APR. 25, 1905.
H. C. TABRETT & W. LEWIN.
COMBINED FEED WATER FILTER AND HEATER.
APPLICATION FILED MAY 11, 1904.
3 SHEETS—SHEET 2.
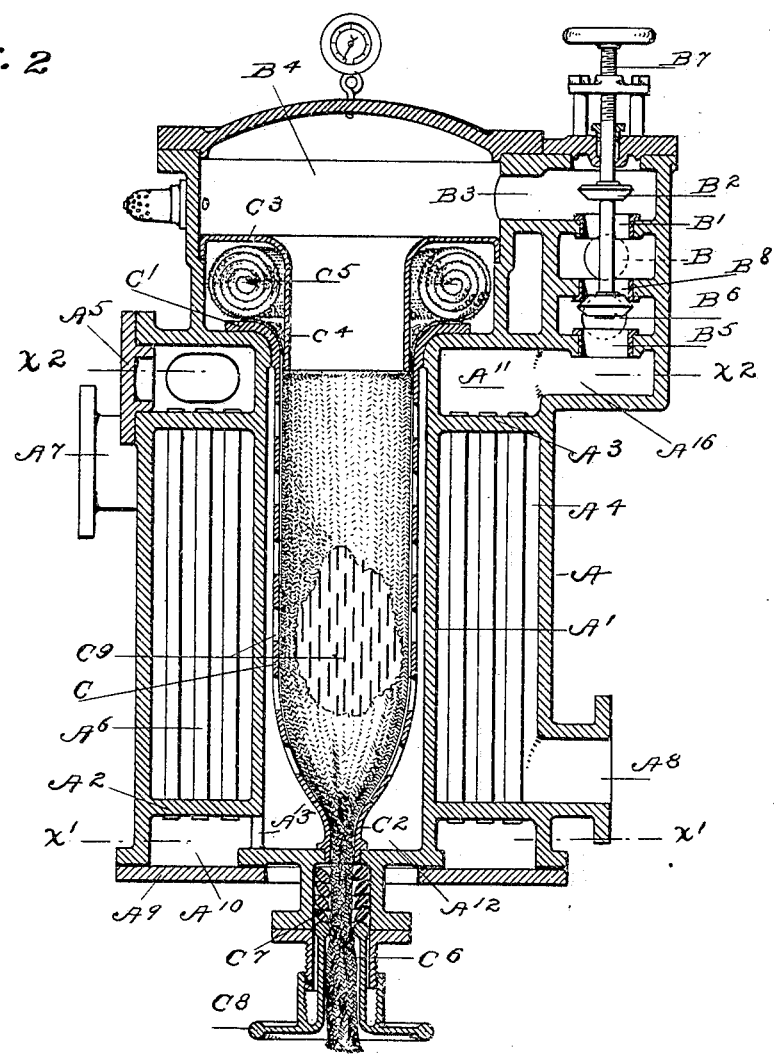
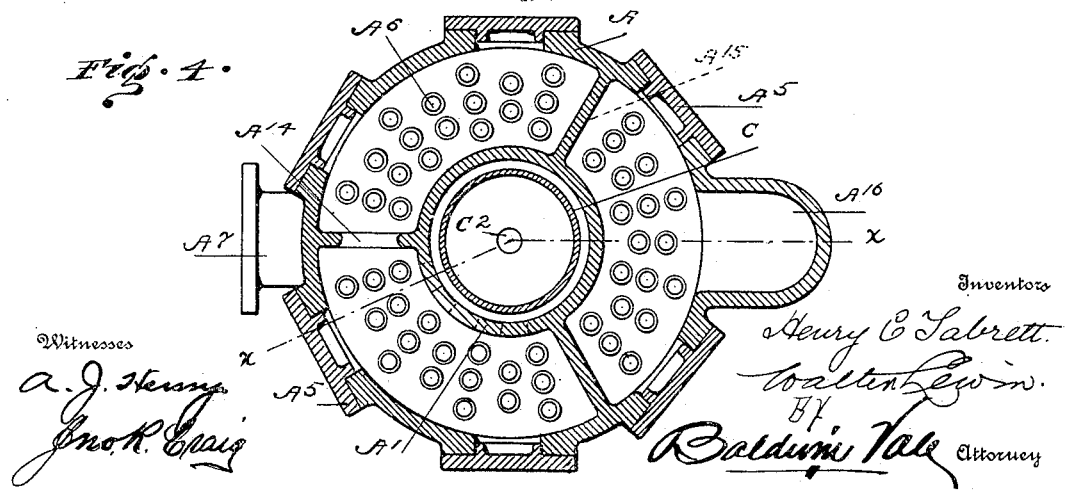

No. 787,958. PATENTED APR. 25, 1905.
H. C. TABRETT & W. LEWIN.
COMBINED FEED WATER FILTER AND HEATER.
APPLICATION FILED MAY 11, 1904.

3 SHEETS—SHEET 3.

Witnesses
A. J. Henry
Jno. R. Craig

Inventors
Henry C. Tabrett
Walter Lewin
BY Baldwin Vale Attorney

No. 787,958. Patented April 25, 1905.

UNITED STATES PATENT OFFICE.

HENRY C. TABRETT AND WALTER LEWIN, OF SAN FRANCISCO, CALIFORNIA.

COMBINED FEED-WATER FILTER AND HEATER.

SPECIFICATION forming part of Letters Patent No. 787,958, dated April 25, 1905.

Application filed May 11, 1904. Serial No. 207,467.

*To all whom it may concern:*

Be it known that we, HENRY C. TABRETT, residing at 3847 Twenty-first street, and WALTER LEWIN, residing at 1227 Page street, in the city of San Francisco, county of San Francisco, and State of California, citizens of the United States, have invented certain new and useful Improvements in a Combined Feed-Water Filter and Heater; and we do hereby declare the following to be a full, clear, and exact description of said invention, such as will enable others skilled in the art to which it most nearly appertains to make, use, and practice the same.

This invention relates to improvements in combined feed-water heaters and filters; and it consists of the novel construction and arrangement of the parts and the novel filtering mechanisms in particular.

In the operation of steam plants it is the practice to pass the exhaust-steam through the feed-water heater on its way to the condenser, thus conserving heat. In its passage through the engine the steam accumulates quantities of oil, which must be extracted by filtration before the water is suitable for repumping into the boiler. Heretofore this process has involved a more or less complicated system of independent mechanisms, resulting in a considerable loss of heat before the exhaust can be condensed, cleansed, and repumped into the boilers.

The objects of this invention are to combine within a single apparatus a feed-water heater and filter whereby the water can be passed directly from the feed-pumps through the combination, losing as little heat as possible *en route* to the boiler; to so arrange the elements of the combination that they can be used independent of each other or the water be passed directly to the boiler, and to effect economy of space, weight, first cost, cost of maintenance, simplicity of parts, increased efficiency, and durability.

Broadly, the invention consists of an annular chamber divided into compartments and headed top and bottom with radiator-tubes extending between said top and bottom, with ports for the inlet and outlet of steam to said tubes and ports for the inlet and outlet of the feed-water circulating through said tubes, and suitable valve-control arrangement forming, in effect, a feed-water heater. Combined with the foregoing heater and coöperating therewith is a filter consisting of a sealed dome, closing the top of the well forming the center of the annular heating-chamber. Within said center well is a dependent slotted tube diametrically reduced at the bottom to communicate with a packing-gland. The dome is divided by a flanged tube extending upward from within the mouth of the said slotted tube, then flanged outwardly to engage the walls of the dome, thus forming an annular hermetic space within the dome. The filtering fabric consists of an annular web rolled inwardly upon itself, the filtering-body extending from the hermetic space between the flanged tube, within the slotted tube, downwardly through the said gland, whereby the feed-water must pass from the said dome through the filtering fabric to escape to the center well within the said annular chamber, thence to the boilers.

Figure 6:
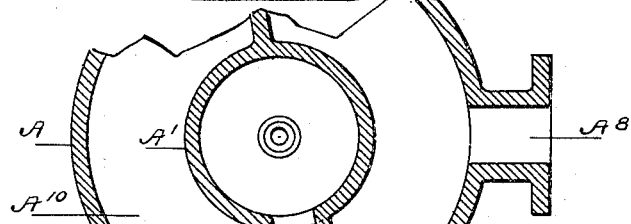

In the drawings, Figure 1 is a front elevation of a combined heater and filter constructed in accordance with this invention. Fig. 2 is a vertical cross-section of the same on the line $x\ x$, Fig. 4. Fig. 3 is a plan in cross-section on the line $x'\ x'$, Fig. 2. Fig. 4 is a similar view on the line $x^2\ x^2$, Fig. 2. Fig. 5 is a side elevation of an alternative construction. Fig. 6 is a plan view in section of the same on the line $x^3\ x^3$, Fig. 5.

In detail the construction consists of the outer shell A, the inner shell A′, and the heads $A^2$ and $A^3$, forming the annular chamber $A^4$. The tubes $A^6$ extend between the heads $A^2\ A^3$, into which they are expanded in the usual manner. The annular chamber $A^4$ is provided with the steam-inlet $A^7$ and outlet $A^8$. The tubes $A^6$ are inserted from the bottom, which is closed by ring-door $A^9$, bolted with interposed gasket to the flanged shell A. The annular divided compartments $A^{10}$ and $A^{11}$ are respectively formed top and bottom to provide communication between the various sections of the chamber $A^4$. Access is had to the compartment $A^{11}$ through the several doors $A^5$.

The filter consists of the inlet B through the valve $B'$, controlled by the valve-gate $B^2$ and communicating through the port $B^3$ with the dome $B^4$, into which the feed-water is introduced direct from the feed-pumps. The center well $A^{12}$ is separated from the dome $B^4$ by the dependent filter-tube C, having the flange $C'$ overhanging the edge and closing the mouth of the well $A^{12}$. This tube is diametrically reduced at $C^2$ and fitted into an opening in the center of the floor of the well $A^{12}$. The dome is divided by the diaphragm $C^3$, hermetically engaging the side walls of the dome and having a dependent tubular extension $C^4$ entering within the mouth of the tube C, leaving a very slight circumferential clearance. An annular space is thus formed within the dome adjacent the mouth of the filtering-tube.

The filtering-web $C^5$ is of the nature of crash-toweling or any suitable fabric with the edges sewed or woven together along the longitudinal edges to form a tubular web. The filtering fabric is rolled inwardly upon itself, as indicated in Fig. 2, and laid around the mouth of the filter-tube and the diaphragm $C^3$ forced into place. The exposed edge of the filtering fabric is pulled from the roll between the tube $C^4$ and the rounded mouth of the filter-tube C downwardly and through the gland $C^6$, within which it is squeezed by the carbonized-rubber rings $C^7$, compressed by the compression-wheel $C^8$, threaded on the neck of the gland. This gland prevents the escape of the feed-water through the bottom of the apparatus. The internal pressure of the feed-water forces the fabric against the walls of the filter-tube and percolates through the fabric and through the slots $C^9$. These slots are sawed through the walls of the tube in lines offset vertically and laterally in order to utilize the whole surface of the fabric, the inner edges of the slots being chamfered to reduced friction on fabric.

In operation the feed-water is introduced direct from the pump, through the inlet B, through the valve $B'$ to the dome and filtering-tube. The snug fit between the tubes C and $C^4$ prevents capillary absorption of oil or water by the reserve roll of filter fabric. The water percolates from the filter-tube into the center well $A^{12}$, thence through the ports $A^{13}$, thence through the tubes $A^6$ of the corresponding section of the annular chamber $A^4$ upwardly, thence through the port $A^{14}$ downwardly through the tubes, thence through the port $A^{15}$ upwardly through the tubes to the port $A^{16}$, thence through the valve $B^5$ to the outlet $B^6$ direct to the boiler. During its passage from the filter through the heater-tubes the water has been subjected to the heat of the exhaust-steam circulating round and about the tubes in its passage through the annular chamber $A^4$. The whole apparatus can be cut out and the water passed direct from the pumps to the boiler by screwing down the valve-stem $B^7$, thus closing the valves $B'$ and $B^5$ and opening $B^8$, by-passing the water through the center-division diaphragm in the valve-casing.

By the simple addition of an auxiliary valve D either the heater or the filter can be cut out independent of the other, Figs. 5 and 6.

In the alternative form of our apparatus we employ an even number of divisions in the tube-sections in lieu of the uneven number in the preferred form, and the chamber $A^{12}$ communicates with the compartment $A^{10}$ by means of a pipe or conduit $D'$ in lieu of ports $A^{13}$. The conduit $D'$ leads to a supplemental valve-casing $D^\times$, in which works a valve-stem D. Said stem carries a valve V, adapted to close a port $D^2$, leading from conduit $D'$ to one of the chambers of compartment $A^{10}$. Said valve is also provided with a face adapted to control a port $D^5$, leading from conduit $D'$ to a pipe $D^4$, which conducts the water to port $A^{16}$, from whence it is discharged, as heretofore described. A valve $V'$, also secured on stem D, controls a port $D^3$, leading direct from one of the chambers of compartment $A^{10}$ to pipe $D^4$. The inlet B is also in direct communication with pipe $D^4$ by means of a pipe $D^6$, leading from a three-way valve 2 to casing $D^\times$ at $D^7$. A pipe $D^8$, provided with a valve, leads from point $D^9$ of casing $D^\times$ direct to outlet $A^{16}$.

To put the water through the heater and filter, open top valve up wide, open bottom valve out wide. The water enters at B, thence through valve $B'$, through filter, through passage $D'$, through port $D^2$ to one of the chambers of compartment $A^{10}$, up and down through tube-sections back to another chamber of compartment $A^{10}$, through port $D^3$, up through pipe $D^4$ to port $A^{16}$, thence to boiler. To put water through filter only, cutting out heater, open top valve up wide, shut bottom valve in tight. The water passes through filter as described, thence through the passage $D'$, through port $D^5$, through pipe $D^4$ to port $A^{16}$, thence to boiler. To put water through heater only, cutting out filter, shut top valve down tight, shut bottom valve in tight, open outlet-valve No. 1, open three-way plug-cock No. 2. The water passes direct from pumps through cock No. 2 and connections, thence up and down through tubes, thence through valve No. 1 and connections direct to boiler. To cut out both filter and heater, shut top valve down hard. The water passes direct from inlet B, through valve $B^8$, to outlet $B^6$, to the boiler.

The apparatus is built to withstand the full boiler-pressure, preferably of cast iron or steel. It may be built up of wrought sheet-steel or any combination of metals or methods common to this art.

The apparatus is fitted with safety appliances consisting of a pressure-gage E and a relief-valve F, placed on the dome B⁴. When the pressure registered on the gage E is in excess of the boiler-pressure, it indicates an impediment within the apparatus, which usually means that the filtering fabric is clogged. When the filter becomes clogged, the gland C⁶ should be slacked off by the hand-wheel C⁸, which will release the grip upon the extended portion of the filtering fabric, although said extended portion remains closely folded and substantially water-tight, especially when clogged by the impurities resulting from filtration. When the grip of gland C⁶ is released, the reduced portion C² of tube C becomes the point of least resistance to the water-pressure, whereupon the fabric will be forced through the gland and simultaneously unroll itself at the upper end, thus automatically exposing fresh fabric for filtration without interrupting the flow of feed-water. Should the pressure rise to the danger-point, it escapes through the relief-valve F.

To insert a fresh filtering fabric, remove the cover from the dome, withdraw the diaphragm C⁴, and place the roll of fabric in place, as described.

To prevent the exhaust-steam from taking a direct line through the annular space A⁴, this space may be divided by vertical webs alternately extending upward and downward from the top and bottom to cause the steam to take a tortuous way through the heater.

Obviously what is known in the art as "double" and "triple" filtrations can be accomplished by doubling or tripling the fabric with or without interposing slotted tubes C between.

Having thus described this invention, what is claimed, and desired to be secured by Letters Patent, is—

1. In a combined heater and filter, an annular chamber formed about a center well; radiator-tubes extending between the top and bottom of said chamber inlets and outlets in said chamber; annular compartments formed adjacent the ends of said tubes; a perforated filter-tube dependent within said center well, and closed at the bottom by a gland; a dome formed above said filter-tube, a flanged diaphragm within the dome, having a tubular extension within the mouth of the filter-tube; a tubular filter fabric rolled inwardly upon itself, and located within the dome under said diaphragm; with its end carried downward within the filter-tube, and through the said gland; outlets from said center well through the tubes; and a triple-acting valve controlling the inlet to the filter, the outlet from the heater, and having a by-pass cutting out both filter and heater.

2. In a combined heater and filter; a heater comprising an annular chamber formed about a center well; radiator-tubes extending between the top and bottom of said chamber, inlets and outlets in said chamber; annular sectional compartments formed adjacent the ends of said tubes; a filter comprising a perforated filter-tube dependent within said center well, and closed at the bottom by a gland; a dome formed above said filter-tube, a flanged diaphragm within said dome, having a tubular extension within the mouth of said filter-tube; a pressure-gage and a relief-valve on said dome; a tubular filter fabric rolled upon itself and located adjacent the mouth of the filter-tube, with its end carried downwardly within the filter-tube and through the said gland; outlets from center well through the heater; a triple-acting valve comprising a center diaphragm dividing the inlet from the outlet of the apparatus, a diaphragm dividing the said inlet from the filter, and a diaphragm dividing the said outlet from the outlet of the heater, a valve-stem controlling valve-gates located in line with valve-seats formed in said diaphragms.

3. A filter comprising a well, a dome formed above said well; a perforated filter-tube dependent in said well, and closed at the bottom by a gland; a flanged diaphragm dividing said dome, and having a tubular extension within the mouth of the filter-tube; a tubular filter fabric rolled upon itself and located in the dome beneath said diaphragm, with its end carried downwardly within the filter-tube, and through said gland; an inlet to said dome, and an outlet from said center well; valves controlling said inlet and outlet; and a pressure-gage and relief-valve located on said dome.

4. In a combined heater and filter; a heater comprising an annular chamber formed about a center well; radiator-tubes extending between the top and bottom of said chamber, inlets, and outlets in said chamber; annular compartments formed adjacent the ends of said tubes; a perforated filter-tube dependent within said center well, and closed at the bottom by a gland; a dome formed above said filter-tube, a flanged diaphragm within the dome, having a tubular extension within the mouth of the filter-tube; a tubular filter fabric rolled upon itself, and located within the dome under said diaphragm, with its end carried downwardly within the filter-tube, and through the said gland; outlets from said center well through the heater, and a triple-acting valve controlling the inlet to the filter, the outlet from the heater, and having a by-pass cutting out both filter and heater; a three-way cock on the main inlet with a branch connection direct through the heater to the outlet thereof; a secondary triple-acting valve comprising a center diaphragm dividing the outlet from the well, from the outlet through the first-mentioned triple-acting valve, a diaphragm dividing the outlet from the well from the inlet to the heater, and a diaphragm dividing the inlet through the three-way cock, from the outlet through the first-mentioned triple-acting valve; a valve-stem controlling valve-gates in line with valve-seats formed in said diaphragms; and an independent pipe and valve leading direct from the heater to main outlet.

In testimony whereof we have hereunto set our hands this 28th day of April, 1904.

HENRY C. TABRETT.
    WALTER LEWIN.

Witnesses:
 BALDWIN VALE,
 A. J. HENRY.